(12) United States Patent
Bak et al.

(10) Patent No.: US 11,404,856 B2
(45) Date of Patent: Aug. 2, 2022

(54) CABLE TERMINATION AND METHOD OF MANUFACTURE

(71) Applicant: Aptiv Technologies Limited, St. Michael (BB)

(72) Inventors: Szymon Bak, Cracow (PL); Tomasz Slizowski, Cracow (PL); Artur Kliszka, Cracow (PL); Paulina Budny, Cracow (PL); Marta Uroda-Bigaj, Cracow (PL); Pawel Kozak, Cracow (PL); Marcelina Skawinska, Czermin (PL); Grzegorz Paletko, Zabierzow (PL); Adam Gorzelak, Woeliczka (PL); Karol Janicki, Kalwaria Zebrzydowska (PL); Michal Cieszynski, Cracow (PL); Marcin Gawlik, Cracow (PL)

(73) Assignee: Aptiv Technologies Limited

( * ) Notice: Subject to any disclaimer, the term of this patent is extended or adjusted under 35 U.S.C. 154(b) by 0 days.

(21) Appl. No.: 17/159,693

(22) Filed: Jan. 27, 2021

(65) Prior Publication Data

US 2021/0257819 A1    Aug. 19, 2021

(30) Foreign Application Priority Data

Jan. 28, 2020    (EP) ..................... 20154014

(51) Int. Cl.
*H01R 4/72*    (2006.01)
*H02G 1/14*    (2006.01)
(Continued)

(52) U.S. Cl.
CPC ............... *H02G 1/145* (2013.01); *H01R 4/72* (2013.01); *H02G 15/04* (2013.01); *H02G 15/1806* (2013.01)

(58) Field of Classification Search
CPC ... H01R 4/10; H01R 4/14; H01R 4/16; H01R 4/18; H01R 4/183; H01R 4/184; H01R 4/185; H01R 4/20; H01R 4/70; H01R 4/72; H02G 1/145; H02G 15/04; H02G 15/08; H02G 15/085; H02G 15/1806; H02G 5/1813; H02G 15/1833; H02G 15/20; H02G 15/23; H02G 15/24
(Continued)

(56) References Cited

U.S. PATENT DOCUMENTS

| 4,450,318 A | * | 5/1984 | Scardina | ............... H01R 4/70 156/48 |
| 5,221,815 A | * | 6/1993 | Bostock | ............... H01R 4/723 174/84 C |

(Continued)

FOREIGN PATENT DOCUMENTS

| CA | 2728300 A | * | 7/2011 | ............. B29C 39/10 |
| CA | 2728300 A1 | | 7/2011 | |

(Continued)

*Primary Examiner* — William H. Mayo, III
(74) *Attorney, Agent, or Firm* — Billion & Armitage

(57) ABSTRACT

A cable termination includes a cable end of a cable having a protective outer jacket and an overmolded sealant. The cable termination is manufactured using a method having the steps of providing a cable end of a cable having a protective outer jacket, preparing the protective outer jacket of the cable end such as to promote adhesion with a sealant, and overmolding the cable end with a sealant.

20 Claims, 2 Drawing Sheets

(51) Int. Cl.
*H02G 15/04* (2006.01)
*H02G 15/18* (2006.01)

(58) Field of Classification Search
USPC ...... 174/74 R, 77 R, 74 A, 84 R, 91, 92, 93, 174/94 R, 84 C
See application file for complete search history.

(56) References Cited

U.S. PATENT DOCUMENTS

| | | | | |
|---|---|---|---|---|
| 5,408,047 | A * | 4/1995 | Wentzel | ............... H02G 15/103 |
| | | | | 156/49 |
| 5,714,715 | A * | 2/1998 | Sundhararajan | ..... H02G 15/046 |
| | | | | 174/20 |
| 5,817,978 | A * | 10/1998 | Hermant | ............... H02G 15/184 |
| | | | | 174/75 C |
| 5,821,461 | A | 10/1998 | Sackett | |
| 7,973,241 | B2 * | 7/2011 | Evoniuk | ............ H02G 15/1833 |
| | | | | 174/84 R |
| 9,543,747 | B2 | 1/2017 | Dew et al. | |
| 9,979,167 | B1 | 5/2018 | Volpone et al. | |
| 10,205,268 | B1 | 2/2019 | Mellott et al. | |
| 2009/0260736 | A1 | 10/2009 | Charette | |
| 2018/0218807 | A1 | 8/2018 | Takahashi | |
| 2020/0412120 | A1 | 12/2020 | Volpone et al. | |

FOREIGN PATENT DOCUMENTS

| | | | | |
|---|---|---|---|---|
| DE | 102004012807.3 | B3 | 6/2005 | |
| DE | 102012223650 | A1 | 6/2014 | |
| EP | 0 508 629 | A2 * | 10/1992 | ............... C08J 5/12 |
| FR | 2683379 | A1 | 5/1993 | |
| GB | 2399235 | A | 9/2004 | |

* cited by examiner

CABLE TERMINATION AND METHOD OF MANUFACTURE

CROSS-REFERENCE TO RELATED APPLICATION

This application claims benefit of priority to European Patent Application No. 20154014.3 filed in the European Patent Office on Jan. 28, 2020, the entire disclosure of which is hereby incorporated by reference.

TECHNICAL FIELD OF THE INVENTION

The present disclosure relates to a method of manufacturing a cable termination. Cable terminations for electrical cables are generally known e.g., as Y-splice, H-splice, T-splice or as cable terminations comprising a plug or a socket. Due to high currents flowing through the cables it is necessary to ensure water tightness and electrical insulation as well as electromagnetic shielding according to the requirements.

BACKGROUND

Current solutions use solid gaskets or liquid gaskets based on silicone adhesives placed in a cover of the housing and solid silicone gaskets that seal between the cable and the housing. If the insulation material of the cable consists of a non-polyvinyl chloride (non-PVC) material, e.g., a silicone material, or a cross-linked polyethylene material (XPLE), or other crosslinked and non-cross-linked polyolefins, a tight and sealed connection of the whole assembly is difficult to achieve. More specifically, if a polyurethane (PUR) material, in particular a two-component polyurethane material is used in sealing applications, it is difficult to apply due to the non-adhesive behavior of the non-PVC cable insulation.

There is a need to provide an improved cable termination which can be manufactured at low cost and which provides a good sealing against water.

BRIEF SUMMARY

The present disclosure provides a cable termination and a method of manufacturing a cable termination according to the independent claims. Embodiments are provided in the subclaims, the description and the drawings.

In one aspect, the present disclosure is directed to a method of manufacturing a cable termination, the method including the steps of: providing a cable end of a cable having a protective outer jacket, e.g., of a high-density crosslinked polyethylene (XLPE) material, preparation of the protective outer jacket of the cable end such as to promote adhesion with a sealant, and overmolding the cable end with a sealant.

According to this method, the outer jacket of the cable end is prepared, e.g., chemically, mechanically or by the provision of additional means, such as to promote adhesion with a sealant. As a result, a sealing interface is formed between the jacket and the sealant.

According to an embodiment, the method includes the use of a polyurethane material as the sealant. This allows the use of low-pressure injection molding technology wherein the overmold of sealant may be molded to form a watertight and sealed outer enclosure of the cable termination without an additional housing being required.

According to an embodiment, the method includes the use of a cable having a protective outer jacket of a non-polyvinyl chloride (PVC) material, e.g., an XLPE material, polyolefins, copolymers of polyolefins, crosslinked polyolefins, and their copolymers. Such materials provide a very poor adhesion to polyurethane materials. Therefore, the preparation step according to the present invention provides a substantial improvement to achieve a tight seal after overmolding the cable end.

According to an embodiment, the method includes the application of a tape onto the protective outer jacket of the cable end. The cable can be a class T3 or T4 tape and it can be wrapped around a cable end or around a plurality of cable ends which are to be overmolded with the sealant. If the cable is a PVC tape applied between the outer jacket and the sealant, the problem of lack of adhesion between the outer jacket and the sealant can be solved because PVC provides a good adhesion to polyurethane materials. The adhesion to the outer jacket can be achieved by using an adhesive glue on the tape, e.g., by using an adhesive PVC tape.

According to an embodiment, the method includes the step of applying a tape of polyethylene terephthalate (PET) material, e.g., a PET fabric tape having a cloth structure. Such cloth structure provides a good adhesion to polyurethane materials and an adhesion to the protective outer jacket can be provided by using an adhesive tape.

According to an embodiment, the method includes the step of applying a cold melt onto the protective outer jacket of the cable end. Such cold melt has good adhesion properties not only to polyurethane materials but also to non-PVC materials such as XLPE, polyolefins, copolymers of polyolefins, crosslinked polyolefins, and their copolymers.

In one aspect, the present disclosure is directed to a method of manufacturing a cable termination, the method including: positioning an annular elastic sealing ring around the cable end, positioning a sleeve made of heat shrinkable material over the sealing ring, heat shrinking the sleeve to exert a compressive force onto the sealing ring and overmolding the sleeve and an adjacent region of the cable with the sealant.

According to this method an elastic sealing ring is first fixed to the outer circumference of the cable by means of heat shrinking a sleeve which has been placed over the sealing ring. Due to the heat shrinking process the sleeve is compressed by the sleeve which exerts a compressive force onto the sealing ring and in particular onto the sealing areas of the ring. Thereafter, the compressed elastic sealing ring is fixedly connected in its compressed state to the outer circumference of the cable end such that no water or humidity may pass between the cable and the sealing ring. On the other hand, the intermediate structure consisting of the sealing ring and the shrunk sleeve allows for an improved interconnection between the overmolded sealant and the cable, in particular if the sleeve and an outer isolating jacket on the cable are made of the same material.

According to a further embodiment a sleeve may be used which may be made of a polyvinyl chloride (PVC) material, polyvinylidene fluoride (PVDF), or fluorinated ethylene propylene (FEP) material such that upon heat shrinking the sleeve tightly fits on and connects with the cable.

According to an embodiment, a sealing ring may be used which is made of a material which has the function of a compressed sealing against the cable insulation and which can be subjected to the process of application of a heat shrink sleeve. An advantageous material is a rubber material or of a silicone material. This ensures a mechanical sealing with all types of cable insulations.

According to a further embodiment the cable end can be positioned in a conductive housing wherein the sleeve is positioned to partly surround the housing. After heat shrinking the sleeve, the adjacent sealing ring is compressed by the sleeve and pressed against the cable on the one hand. On the other hand, the heat shrunk sleeve also connects to the housing. Therefore, the cable is additionally protected against pull-out forces trying to withdraw the cable from the housing and from the overmolding which may also cover the housing.

According to a further embodiment, an adhesive can be applied to an inner surface of the sleeve. For example, the inner wall of the sleeve can be coated or laminated with an adhesive or a separate adhesive layer can be introduced between the sleeve and the sealing ring before heat shrinking.

According to a further embodiment, the preparation step includes the application of a rubber or silicone material onto the protective outer jacket of the cable end. Due to the tight grip between such seal, e.g., an annular sealing ring, an additional barrier for water penetration is provided and the sealing ring also provides a mechanical means for promoting the adhesion of the sealant to the outer jacket.

According to an embodiment, the sealing ring applied onto the protective outer jacket is one of a PVC material, a rubber, a polytetrafluomethylene (PTFE), or a silicone material. For example, sealing ring may be formed of at least one of ethylene propylene rubber (EPR), nitrile butadiene rubber (NBR), Standard Indonesia Rubber (SIR), fluororubber (FPM), Ethylene acrylic rubber (AEM), fluorosilicone, fluorocarbon, and polyacrylate rubber.

According to an embodiment the preparation step includes plasma treating or corona treating the protective outer jacket of the cable end. The plasma or corona treatment enables an adhesion of an outer jacket of the cable end with a polyurethane overmolding. The plasma or corona treatment of the protective outer jacket provides a waterproof application of the sealant and ensures high mechanical resistance against pull-out forces.

According to an embodiment, the preparation step includes chemically treating the protective outer jacket of the cable end with a solvent, e.g., by applying an alcohol, such as isopropanol. By chemically treating the protective outer jacket, the surface of the outer jacket is cleaned, and contaminants are removed, which helps to avoid impurities to be formed on the surface which would otherwise prevent the adhesion of polyurethane sealants. Isopropanol is chemically neutral to the protective outer jacket and evaporates quickly. The treated surface tends to increase the adhesion evenly distributed over the surface of the outer jacket which leads to an increased tightness between the outer jacket and the sealant. Of course, it is also possible to use other solvents, such as acetone.

According to an embodiment the preparation step includes a mechanical treatment of the protective outer jacket of the cable end, e.g., a roughening of the outer jacket. Such roughening can be performed by means of an abrasive material, such as sandpaper or the like. Other mechanical treatment methods that can be used include sand blasting, soda blasting, and metal/non-metal brushing, e.g., using a wire brush.

According to a further embodiment the preparation step includes the combined mechanical and chemical treatment of the outer jacket. After the outer jacket is mechanically treated to roughen the surface, remaining particles are removed by cleaning the outer jacket with a solvent, e.g., isopropanol. These two combined steps create a clean area with an increased contact surface between the outer jacket and the sealant. This leads to a modification of the surface energy and allows to build a connection between the overmold and the outer jacket that can be used as a water barrier.

In another aspect, the present disclosure is directed to a cable termination, manufactured by a method described herein.

According to an embodiment, the cable termination may include an annular elastic sealing ring positioned over a cable end, a sleeve made of heat shrinkable material and heat shrunk over the sealing ring thereby compressing the sealing ring, and an overmold of sealant covering the sleeve and adjacent region of the cable end.

According to an embodiment, the sealant is made of a polyurethane material. Such material is well suited for applying a sealant by low pressure injection molding with a 100% tight insulation against water, a resistance against oils, acids and chemicals and a resistance to temperature and vibrations. By overmolding a polyurethane material, it is further possible to implement markings or logos and to produce the overmolding in any desired color. Furthermore, a PUR overmold material may be solid or foam.

According to a further embodiment the overmold of sealant forms an outer enclosure of the cable termination such that no separate housing or enclosure is required.

Further embodiments of the cable termination are a Y-splice, T-splice, or an H-splice, e.g., for high voltage applications in electric vehicles.

BRIEF DESCRIPTION OF THE DRAWINGS

The present invention will now be described, by way of example with reference to the accompanying drawings, in which.

DETAILED DESCRIPTION

Figure 1:
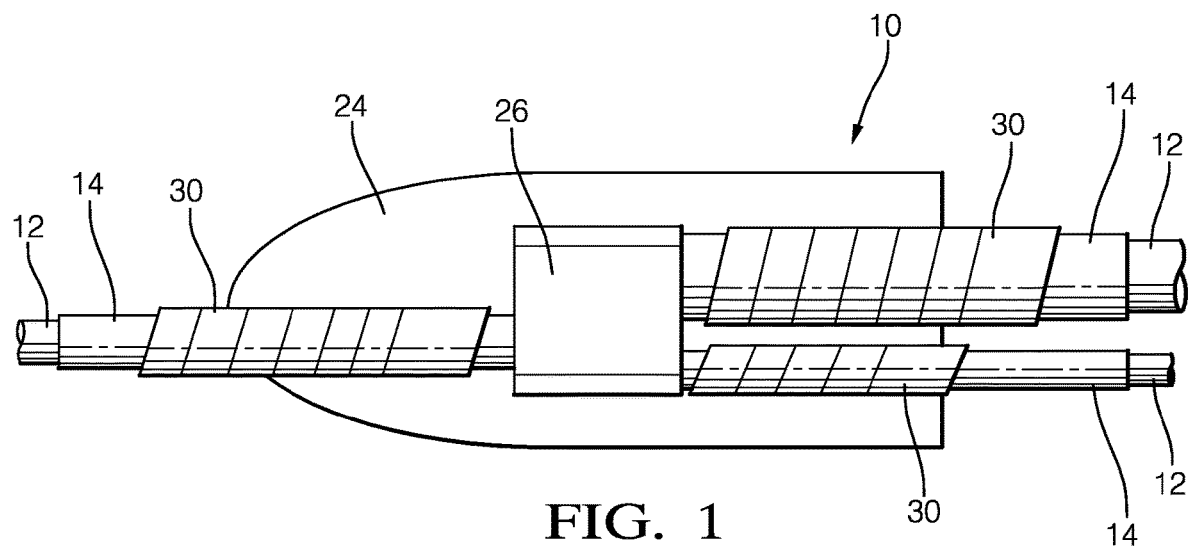
FIG. 1 illustrates an embodiment of a cable termination.

FIG. 1 depicts an exemplary termination of a cable end 10 in the form of a Y-splice, the cable termination including three electrical conductors 12 surrounded by an insulating jacket 14 made of a non-PVC material, e.g., a polyolefin, polyethylene, or silicone material. The cable termination includes a splice, e.g., a copper splice 26 connecting the three electrical conductors 12. In the region of the copper splice 26 the cable end 10 is provided with an overmolding of sealant 24, e.g., of a polyurethane foam material. To improve the adhesion between the outer jackets 14 and the sealant 24 an adhesive PVC tape 30, e.g., of class T3 or T4, is wrapped around the outer protective jackets 14 next to the copper splice 26. The overmold of sealant 24 is applied with an excellent adhesion between the sealant 24 and the outer jackets 14 of the cables.

Figure 2:
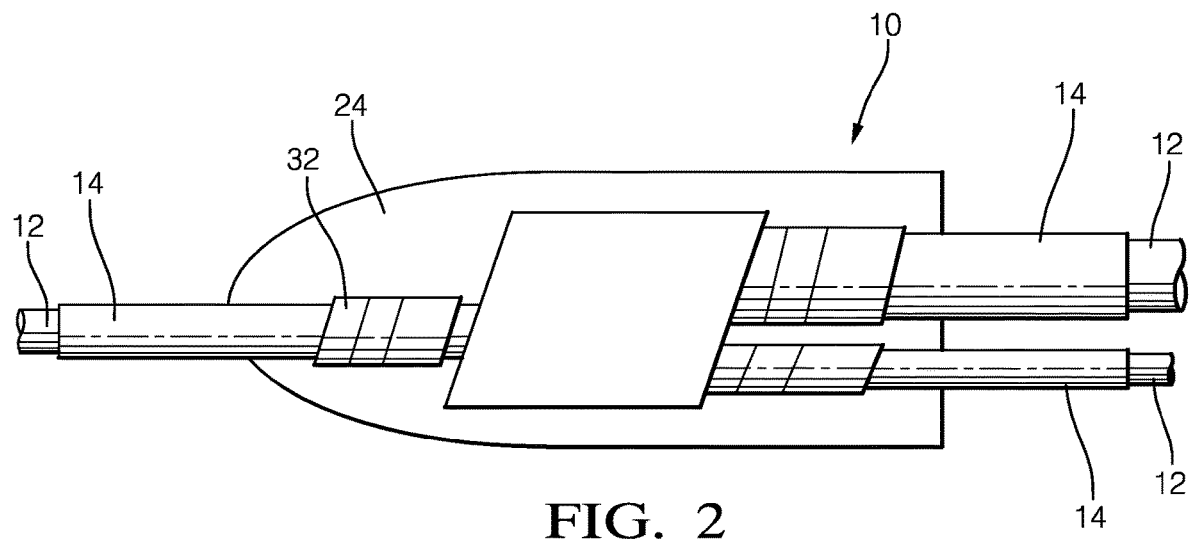
FIG. 2 illustrates a further embodiment of a cable termination.

FIG. 2 depicts a further embodiment of a cable termination like the embodiment of FIG. 1 wherein the preparation of the protective outer jackets 14 is performed by applying a cold melt 32 onto the outer jackets 14 and onto the copper splice 26.

Figure 3:
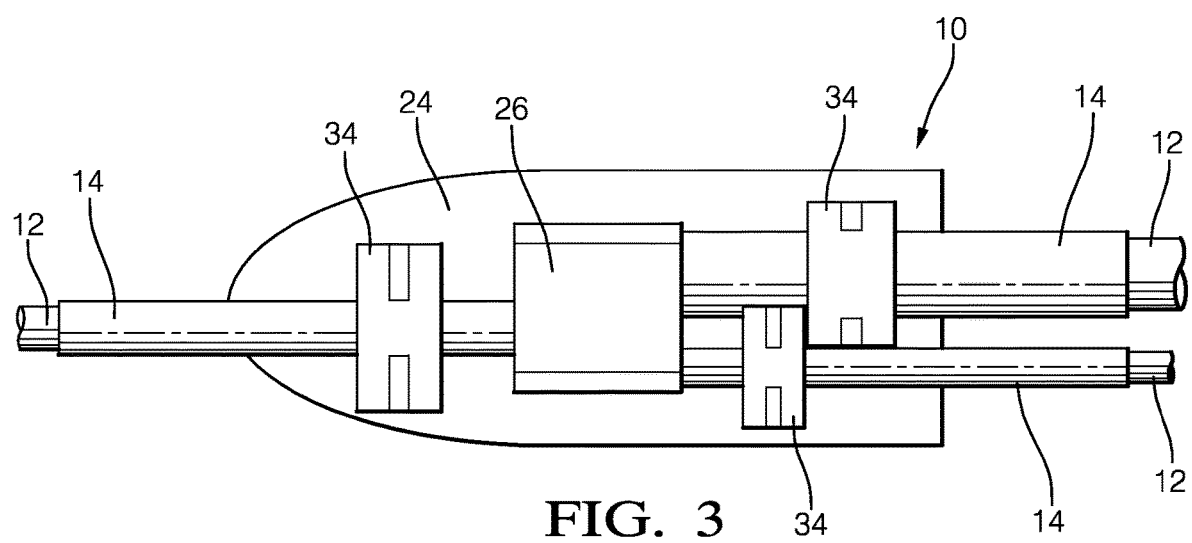
FIG. 3 illustrates a further embodiment of a cable termination.

FIG. 3 depicts a further embodiment of a cable termination wherein sealing rings 34 of a rubber or silicone material are applied onto the protective outer jackets adjacent to the copper splice 26 to promote adhesion of the overmold of the sealant 24 and to provide a watertight sealing.

Figure 4:
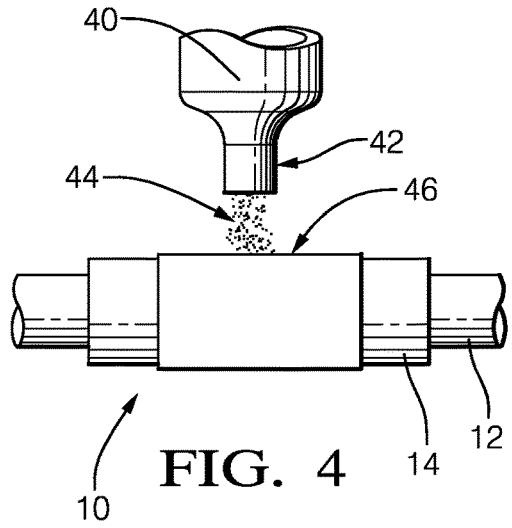
FIG. 4 illustrates a plasma treatment of a cable end.

FIG. 4 depicts a cable end of a cable termination including an electrical conductor 12 surrounded by an insulating jacket 14 wherein a plasma head 40 including a plasma nozzle 42 is used for treating the protective outer jacket 14 with a plasma beam 44 resulting in a plasma treated area 46 extending over the circumference of the outer jacket 14 which is made of a non-PVC material, e.g., of a XLPE material, polyolefins, copolymers of polyolefins, crosslinked polyolefins, and their copolymers.

Figure 5:
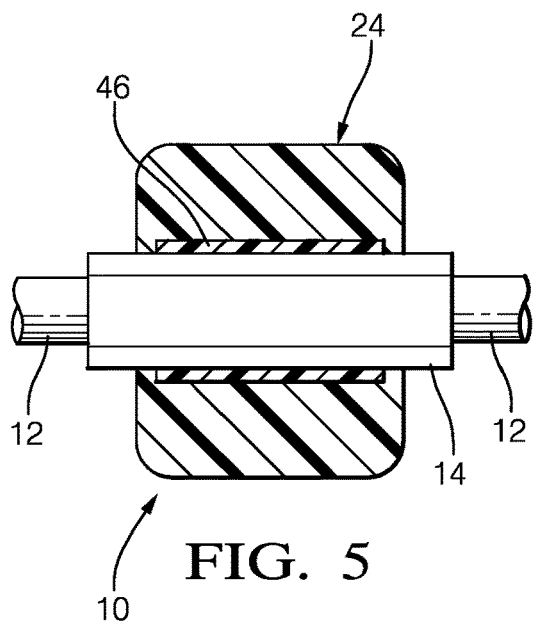
FIG. 5 illustrates a cross-section through a cable end according to a further embodiment.

FIG. 5 depicts a cross-section of the cable end 10 shown in FIG. 4 which has been overmolded with a sealant 24 of polyurethane foam. The preparation of the protective outer jacket 14 through application of atmospheric plasma significantly promotes the adhesion of the sealant 24 to the outer jacket 14.

Figure 6:
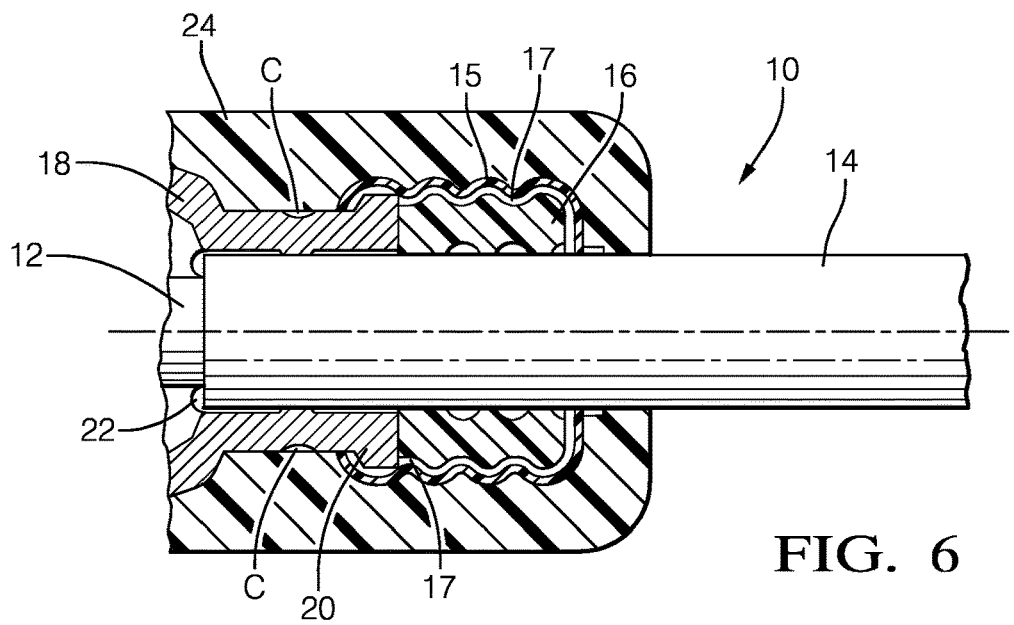
FIG. 6 illustrates a partially cut-off section of a cable termination.

FIG. 6 depicts a termination of a cable end 10, the cable including one or more electrical conductors 12 surrounded by an insulating jacket 14 made of a non-PVC material, e.g., a polyolefin, polyethylene, or silicone material. The cable termination includes an annular elastic sealing ring 16 of a rubber or a silicone material or of any other material such as PTFE that has the function of compressed sealing against the cable insulation. The sealing ring 16 is optionally serrated e.g., by providing annular grooves at the outer circumference, and is positioned over the cable end 10 to surround its outer circumference. The sealing ring 16 may include at least one of ethylene propylene rubber (EPR), nitrile butadiene rubber (NBR), Standard Indonesia Rubber (SIR), fluororubber (FPM), Ethylene acrylic rubber (AEM), fluorosilicone, fluorocarbon, and polyacrylate rubber.

In the disclosed embodiment the cable end 10 extends into a conductive housing 18 wherein the sealing ring 16 is located adjacent an end surface of the housing 18. Next to the sealing ring 16 the housing 18 is provided with a collar 20 forming an annular protrusion.

Before the cable end 10 is inserted into the housing 18, a sleeve 15 which is made of heat shrinkable material (e.g., a polyvinyl chloride (PVC) material, polyvinylidene fluoride (PVDF), or fluorinated ethylene propylene (FEP) material and the sealing ring 16 are positioned over the cable end and a braided shield 22 of the cable is folded backwards. Thereafter, the cable end 10 is inserted into the housing 18 such that the braided shield 22 is located between the inner circumference of the housing 18 and the insulating jacket 14 of the cable end 10. Thereafter, the housing 18 is caulked at a location C around its outer circumference to connect the cable end 10 with the housing 18 and to provide an electrically conductive interconnection between the housing 18 and the braided shield 22.

To compress the sealing ring 16 and to provide a tight seal against water and humidity, the sealing ring 16 is compressed by the sleeve 15 which is positioned over the sealing ring 16 and the collar 20. The sleeve 15 is thereafter heat shrunk over the sealing ring 16 and the collar 20 of the housing 18 and snuggly fits against the insulating jacket 14 of the cable end 10. Thereafter, the housing 18, the sealing ring 16, the sleeve 15 and the cable end 10 are connected to form a unit.

Finally, the sleeve 15, the sealing ring 16 the adjacent region of the cable end 10 and the housing 18 are provided with an overmolding of sealant 24 (e.g., a polyurethane sealant). The sealant forms an outer enclosure of the cable end 10.

To improve the adhesion between the sleeve 15, the sealing ring 16, the insulating jacket 14 and the optional housing 18 an adhesive layer 17 may be provided at the inner surface of the sleeve 15. Such adhesive can be coated onto the sealing ring or can be provided as a separate intermediate layer.

It should be noted that the adhesive layer 17 and the housing 18 are merely optional and not necessarily required to provide a cable end which is sealed and isolated against humidity and water. Furthermore, the housing 18 may be designed as or to include a plug or a socket. Further embodiments of the cable termination are a Y-splice, T-splice, or an H-splice, e.g., for high voltage applications in electric vehicles.

Figure 7:
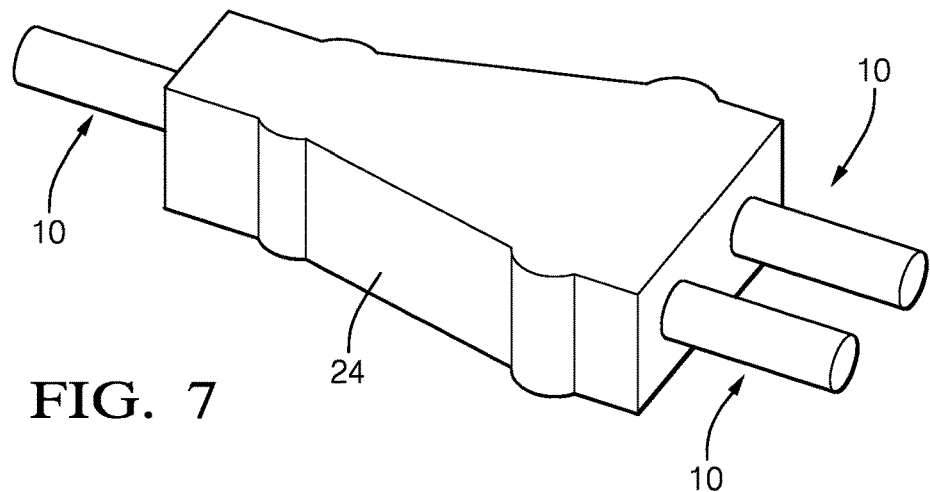
FIG. 7 illustrates a cable termination in the form of a Y-splice.

FIG. 7 depicts an example of a Y-splice including three cable ends 10 enclosed in an overmolding of sealant 24 of polyurethane material having a block shape and forming an outer enclosure of the Y-splice.

The invention claimed is:

1. A method of manufacturing a cable termination, the method comprising:
   providing a cable end of a cable having an insulation jacket;
   preparing the insulation jacket of the cable end to promote adhesion with a sealant; and
   overmolding the cable end with a sealant, wherein the sealant is a polyurethane (PUR) material provided as a protective outer jacket of the cable termination to form a watertight and sealed outer enclosure of the cable.

2. The method according to claim 1, wherein the insulation jacket is a non-polyvinyl chloride material comprising at least one of polyolefins, copolymers of polyolefins, crosslinked polyolefins, and their copolymers.

3. The method according to claim 1, wherein the step of preparing the insulation jacket comprises:
   applying a tape onto the insulation jacket of the cable end.

4. The method according to claim 3, wherein the tape is an adhesive tape.

5. The method according to claim 3, wherein the tape is a polyvinyl chloride tape.

6. The method according to claim 3, wherein the tape is a polyethylene terephthalate tape.

7. The method according to claim 6, wherein the tape is a polyethylene terephthalate cloth tape.

8. The method according to claim 1, wherein the step of preparing the insulation jacket comprises:
   applying a cold melt onto the insulation jacket of the cable end.

9. The method according to claim 1, further comprising the steps of:
   positioning an annular elastic sealing ring around the cable end;
   positioning a sleeve made of heat shrinkable material over the sealing ring;
   heat shrinking the sleeve to exert a compressive force onto the sealing ring; and
   overmolding the sleeve, the sealing ring, and an adjacent region of the cable end with the sealant.

10. The method according to claim 9, wherein the cable end is positioned in a conductive housing and wherein the sleeve is positioned to partly surround the housing.

11. The method according to claim 9, wherein an adhesive is applied to an inner surface of the sleeve.

12. The method according to claim 1, wherein the step of preparing the insulation jacket comprises:
applying a rubber or silicone material onto the insulation jacket of the cable end.

13. The method according to claim 12, wherein the material is selected from a list consisting of a polyvinyl chloride material, a rubber, a polytetrafluoroethylene material, or a silicone material.

14. The method according to claim 1, wherein the step of preparing the insulation jacket comprises:
plasma treating or corona treating the insulation jacket of the cable end.

15. The method according to claim 1, wherein the step of preparing the insulation jacket comprises:
chemically treating the insulation jacket of the cable end with a solvent.

16. The method according to claim 1, wherein the step of preparing the insulation jacket comprises:
mechanically treating the insulation jacket of the cable end, the mechanical treatment selected from a list consisting of:
roughening the insulation jacket using an abrasive material;
sand blasting the insulation jacket;
soda blasting the insulation jacket; or
brushing the insulation jacket.

17. A cable termination comprising a cable end of a cable having an insulation jacket, and an overmolded sealant, manufactured using a method comprising:
providing a cable end of a cable having an insulation jacket;
preparing the insulation jacket of the cable end to promote adhesion with a sealant; and
overmolding the cable end with a sealant, wherein the sealant is a polyurethane (PUR) material provided as a protective outer jacket of the cable termination to form a watertight and sealed outer enclosure of the cable.

18. The cable termination according to claim 17, wherein the insulation jacket of the cable end is made of a non-polyvinyl chloride material.

19. The cable termination according to claim 18, wherein the non-polyvinyl chloride material comprises at least one of a polyolefin, copolymers of polyolefins, crosslinked polyolefins, and their copolymers.

20. The cable termination according to claim 17, comprising a plug, a socket, a Y-splice, H-splice, or T-splice.

* * * * *